United States Patent
Nakamura

(10) Patent No.: US 7,373,610 B2
(45) Date of Patent: May 13, 2008

(54) SKIN GENERATING METHOD, PROGRAM, AND APPARATUS

(75) Inventor: Yasufumi Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 616 days.

(21) Appl. No.: 10/778,222

(22) Filed: Feb. 17, 2004

(65) Prior Publication Data

US 2005/0010873 A1    Jan. 13, 2005

(30) Foreign Application Priority Data

Jul. 11, 2003    (JP)    ............................... 2003-273397

(51) Int. Cl.
*G06F 3/00*    (2006.01)
(52) U.S. Cl. ...................... 715/765; 715/744; 715/747; 345/581
(58) Field of Classification Search ................ 715/744, 715/765, 747; 345/581
See application file for complete search history.

(56) References Cited

U.S. PATENT DOCUMENTS

| | | | |
|---|---|---|---|
| 5,905,492 A * | 5/1999 | Straub et al. ............... | 715/744 |
| 6,784,900 B1 * | 8/2004 | Dobronsky et al. ......... | 715/744 |
| 2002/0054086 A1 * | 5/2002 | Van Oostenbrugge et al. ......................... | 345/744 |
| 2003/0071860 A1 * | 4/2003 | Goddard et al. ............ | 345/866 |
| 2004/0210825 A1 * | 10/2004 | Novak et al. ............. | 715/500.1 |
| 2004/0216054 A1 * | 10/2004 | Mathews et al. ........... | 715/765 |
| 2004/0250213 A1 * | 12/2004 | Shalabi et al. .............. | 715/762 |

FOREIGN PATENT DOCUMENTS

| | | |
|---|---|---|
| JP | 2001-356851 | 12/2001 |
| JP | 2002-126355 | 5/2002 |
| JP | 2002-140114 | 5/2002 |

* cited by examiner

*Primary Examiner*—Kieu D. Vu
*Assistant Examiner*—Dennis G. Bonshock
(74) *Attorney, Agent, or Firm*—Staas & Halsey LLP

(57) ABSTRACT

When accessing a web page on the internet or a file on a local machine, the image file selecting unit selects a plurality of image files to be used for skin generation from a group of image files stored in the temporary storing unit of the browser. The skin image generating unit generates skin images through combination and arrangement of the plurality of selected image files. The update interval setting unit sets an update interval between skin images generated by the image file selecting unit and the skin image file selecting unit and the skin image generating unit.

3 Claims, 10 Drawing Sheets

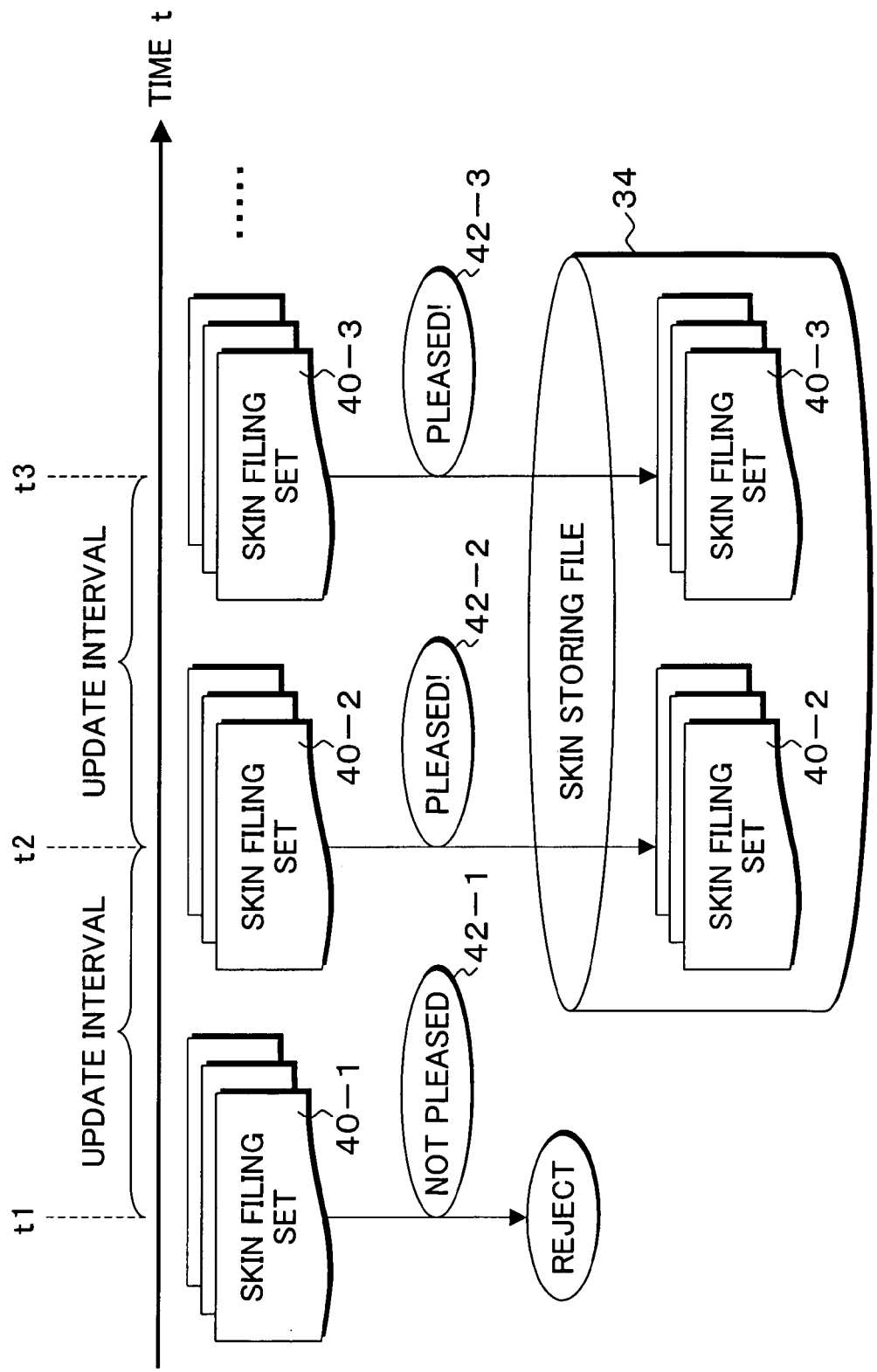

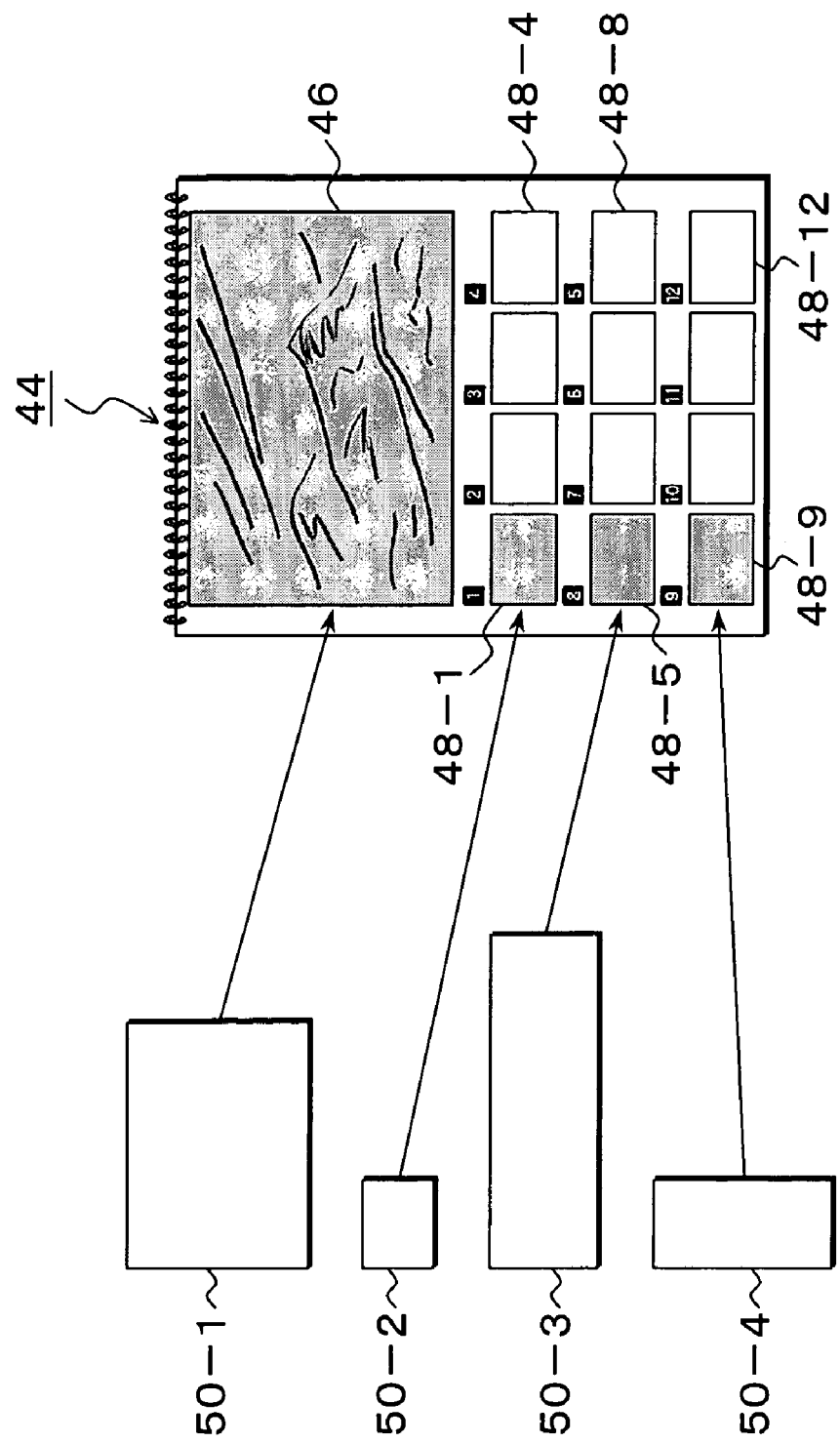

SKIN GENERATING METHOD, PROGRAM, AND APPARATUS

BACKGROUND OF THE INVENTION

1. Field of the Invention

The present invention relates to a skin generating method, a program and an apparatus for automatically generating and updating a skin image of an application.

2. Description of the Related Art

As a result of the recent improvement of graphic functions of personal computers, application designs are becoming exquisite. Along with this tendency, some applications provide a skin generating function permitting a change in look by a uniform design by use of a mechanism known as a skin, so that the appearance of images of the title page or the like can be modified so as to satisfy user's preference.

Data used for such skin generation are usually provided by the vendor of the application as a set, and a user can change images into a consistent design by applying the data forming the set altogether.

Known techniques for incorporating prepared images on user level into an application include a technique of making such a change by purchasing a user interface of a home network system via the internet from a provider or acquiring the same from a package medium such as a CD (Patent Document 1); a technique of incorporating an image file stored in an external storage or a favorite image acquired via the internet into a screen of a game (Patent Document 2); and a technique of a design editing apparatus which enables the user to edit designs on an operation monitoring display of process control (Patent Document 3).

[Patent Document 1] Japanese Unexamined Patent Application Publication No. 2001-356851

[Patent Document 2] Japanese Unexamined Patent Application
Publication No. 2002-126355

[Patent Document 3] Japanese Unexamined Patent Application
Publication No. 2002-14114

For general users, a first problem lies in that it is very difficult to prepare a skin.

In a conventional application having a function of modifying a skin, there are usually a huge number of changeable image sets. It was therefore difficult for users other than professional designers. There are available only a few applications which open a skin changing interface. It was thus very difficult to independently prepare a skin in a usual case.

In the above-mentioned Patent Documents 1 and 2, while the number of images to be incorporated is small, it is possible to apply images by individually selecting favorite images. However, when applying this technique to an application requiring many image files as in a case where an image is pasted to each of parts of a music player for which skins are provided, the operation of selection by the user for each part is not realistic.

As in the design editing apparatus disclosed in Patent Document 3, a design editing program may be provided for particular applications. This apparatus is however rather for those who have the knowledge of process control to some extent and use such apparatus as an assistant for design editing. The apparatus is not therefore applicable as a general tool.

A conventional application having a function of modifying a skin has a problem of a limited number of choices for skin modification. More specifically, even skins provided by the vendor of the application are usually small in number, and the user cannot easily find his (her) favorite skin, or skins of new designs are not added quickly. As a result, the appearance of the application cannot be modified so often, resulting in circumstances not to the satisfaction of users who are very fond of novelties.

In Patent Document 1, for example, which suggests purchasing a design prepared by the service provider who provides interface information, the user would use another design if there is no favorite design among the provided ones.

SUMMARY OF THE INVENTION

It is an object of the present invention to provide skin generating method, program and apparatus automatically generating a skin by use of image files cached upon internet access.

The present invention provides a program for skin generation. The program causes a computer to execute:

an image file selecting step of selecting a plurality of image files from a group of image files stored in a temporary storing unit of a browser; and a skin image generating step of generating a skin image through combination and arrangement of the plurality of selected image files.

The program of the present invention further comprises an update interval setting step of setting an update interval of the skin images generated in the image file selecting step and the skin image generating step.

The image file selecting step comprises selecting image files to be used to skin generation from the group of image files stored in the temporary storing unit of the browser on the basis of selection criteria defining information set in advance by the user. The selection criteria defining information in this case defines a favorite color, a favorite shape, a favorite article, or a combination thereof as user selection criterion.

The image file selecting step comprises calculating a degree of favor for an image file regarding the favorite color, the favorite shape, or the favorite article defined by the user as the selection criteria defining information, and preferentially selecting image files of a high degree of favor.

The skin image generating step comprises generating a skin image through combination and arrangement of the plurality of selected image files on the basis of the skin defining information provided by the application. The skin image generating step comprises carrying out image processing including size conversion, synthesizing or trimming of the plurality of selected image files so as to meet the skin image.

The skin image generating step comprises storing the generated and displayed skin images in the skin image storing file on the basis of user's input of instruction to make the same available. The present invention provides a skin generating method. The skin generating method comprises: an image file selecting step of selecting a plurality of image files from a group of image files stored in a temporary storing unit of a browser by an image file selecting unit 24; and a skin image generating step of generating a skin image through combination and arrangement of the plurality of selected image files by the skin image generating unit 26.

The program causes a computer to execute an update interval setting step of setting an update interval of the skin images generated in the image file selecting step and the skin image generating step.

The present invention provides a skin generating apparatus. The skin generating apparatus comprises an image file selecting unit 24 which selects a plurality of image files to be used for skin generation from the group of image files stored in a cache of a browser upon accessing a web page on the internet, and a skin image generating unit 26 which generates skin images through combination and arrangement of the plurality of selected image files. The skin generating apparatus further comprises an update interval setting unit 28 which sets an update interval between skin images generated by the image file selecting unit 24 and the skin image generating unit 26.

The details of the skin generating method and the apparatus of the present invention are basically the same as those of the skin generating program.

According to the present invention, upon accessing the internet or a file on a machine on a local network, the user specifies a favorite image in advance by introducing a mechanism for automatically generating a skin by reuse of image files temporarily stored in the browser. This permits file selection along with user's preference, thus saving user's trouble, and facilitating preparation of a favorite skin.

As the number of accesses to the internet or to the local network increases, new image files are temporarily stored, and a skin image prepared every time differs from the others. It is thus possible to automatically generate new skins without limit.

At homes, people often net-surfs hobby sites of their preference. The probability of favorite images included in the cached images is usually estimated to be higher than in a case where images are randomly downloaded from the site.

The prepared skins are updated at certain time intervals. At the point in time when a favorite skin is reached, the user can register it as a favorite skin, and can instruct a change to the favorite skin at any time thereafter.

The above and other objects, features, and advantages of the present invention will become more apparent from the following detailed description with reference to the drawings.

BRIEF DESCRIPTION OF THE DRAWINGS

FIG. 5 is a descriptive view of skin update and store in the present invention;

FIG. 6 is a descriptive view of skin generation in a typical example of calendar application;

DESCRIPTION OF THE PREFERRED EMBODIMENTS

Figure 1:
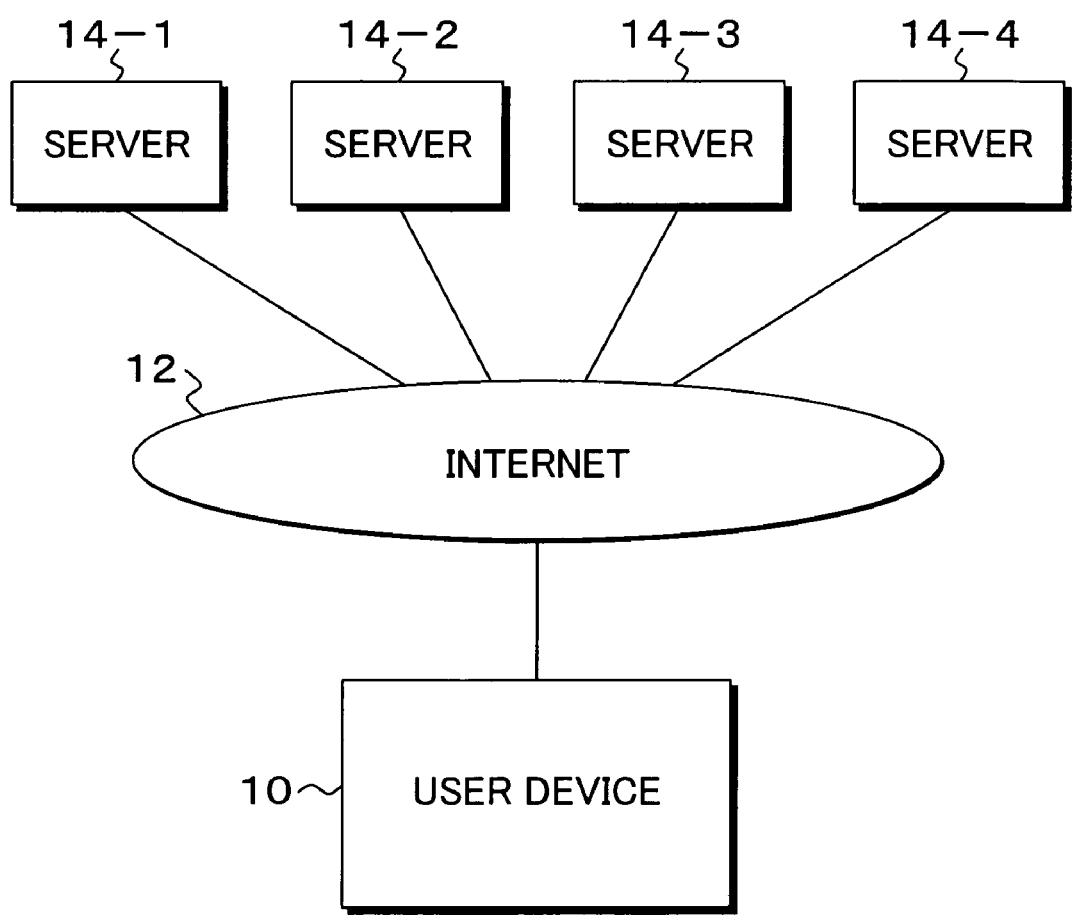
FIG. 1 is a descriptive view of the use environment of the present invention.

FIG. 1 is a descriptive view of the use environment to which the skin generating processing of the present invention is applied. In FIG. 1, a user device 10 is, for example, a personal computer, in which a skin application is installed, and in addition, a program for skin generating processing of the present invention is installed. The user device 10 has a WWW browser, permitting perusal of web sites of servers 14-1 to 14-4 via the internet 12. The WWW browser can access also files of a machine existent on a local network such as a LAN. When accessing a web site on the internet 12 or a file on a local machine by use of the user device 10, the image of the web page is cached in a cache folder functioning as a temporary storing unit on the user device 10 side. Upon skin image processing of the present invention, the image temporarily stored in the WWW browser is used for skin generation.

Figure 2:
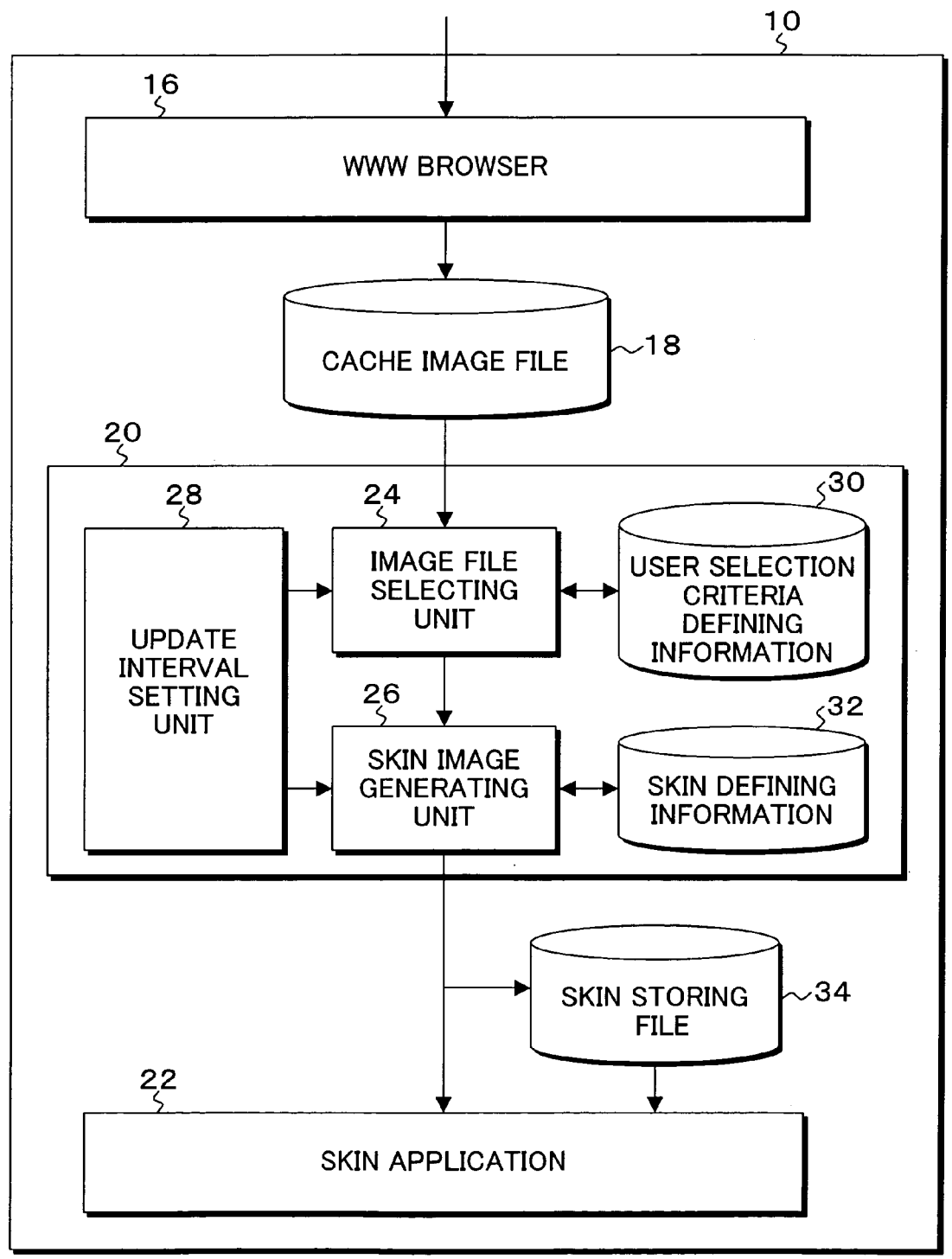
FIG. 2 is a block diagram of a user device having the functional configuration of the present invention.

FIG. 2 is a block diagram of a user device 10 having a functional configuration of the skin processing of the present invention. In FIG. 2, the user device 10 has a WWW browser 16, a cache image file 18, a skin generating unit 20 provided by the present invention, and a skin application 22. The skin generating unit 20 has an image file selecting unit 24, a skin image generating unit 26, an update interval setting unit 28, a user selection criteria defining information 30 and a skin defining information 32. Furthermore, a skin storing file 34 for storing skin images generated in the skin generating unit 20 is provided for a skin application 20. When perusing a web page on a site on the internet or perusing a file of a local machine on a local net by means of the WWW browser 16, the image file of the page displayed for perusal of the web page is retained for a while on the cache image file (cache holder) 18 serving as a local disk. The skin generating unit 20 of the present invention uses the image file 18 of the web page temporarily stored in this cache image file 18 for generation of a skin image. This eliminates the necessity of downloading anew the image file for generation of the skin image, thus making it possible to reduce the volume of transferred data, and reduce the access time. The image file selecting unit 24 of the skin generating unit 20 selects a plurality of image files to be used for skin generation from the group of image files stored in the cache image file 18 of the WWW browser 16. This selection of the image files is accomplished on the basis of the user selection criteria defining information 30. The user selection criteria defining information 30 defines a favorite color, a favorite shape, a favorite article, or a combination thereof defined by the user. By varying this user selection criteria defining information 30, the image file selecting unit 24 can preferentially select an image file meeting the preference defined by the user. For the purpose of ensuring preferential selection of image files meeting user's preference, the image file selecting unit calculates a degree of favor for an image file regarding the favorite color, the favorite shape or the favorite article defined by the user, and preferentially selects image files of a high degree of favor. The skin image generating unit 26 generates skin images through combination and arrangement of the plurality of image files selected by the image file selecting unit 24 so as to meet the skin image provided by the skin application 22. The skin defining information 32 is set in advance for skin image generation by this skin image generating unit 26. That is, the skin defining information 32 defines the coordinates of image applying position, the size and the like in accordance with the image format of the skin image provided by the skin application 22. The skin image generating unit 26 carries out image processing including size conversion (enlargement or reduction), synthesis of a plurality of images, or trimming which hollows out a specific portion of the image of the image files selected by the image file selecting unit 24 so as to meet the skin image defined by the skin defining information. The skin image generating unit 26 stores the image file setting for skin image generation in a skin storing file 34 on the basis of input of an instruction to store newly generated and displayed skin images into the user's preference for reuse. The update interval setting unit 28 provided in the skin generating unit 20 arbitrarily sets an update interval for skin image generated by the image file selecting unit 24 and the skin image generating unit 26. Simultaneously with setting of the update interval, the update interval setting unit 28 can set an automatic update mode as required, in which generation of skin images is automatically accomplished at an update interval set at this point in time.

Figure 3:
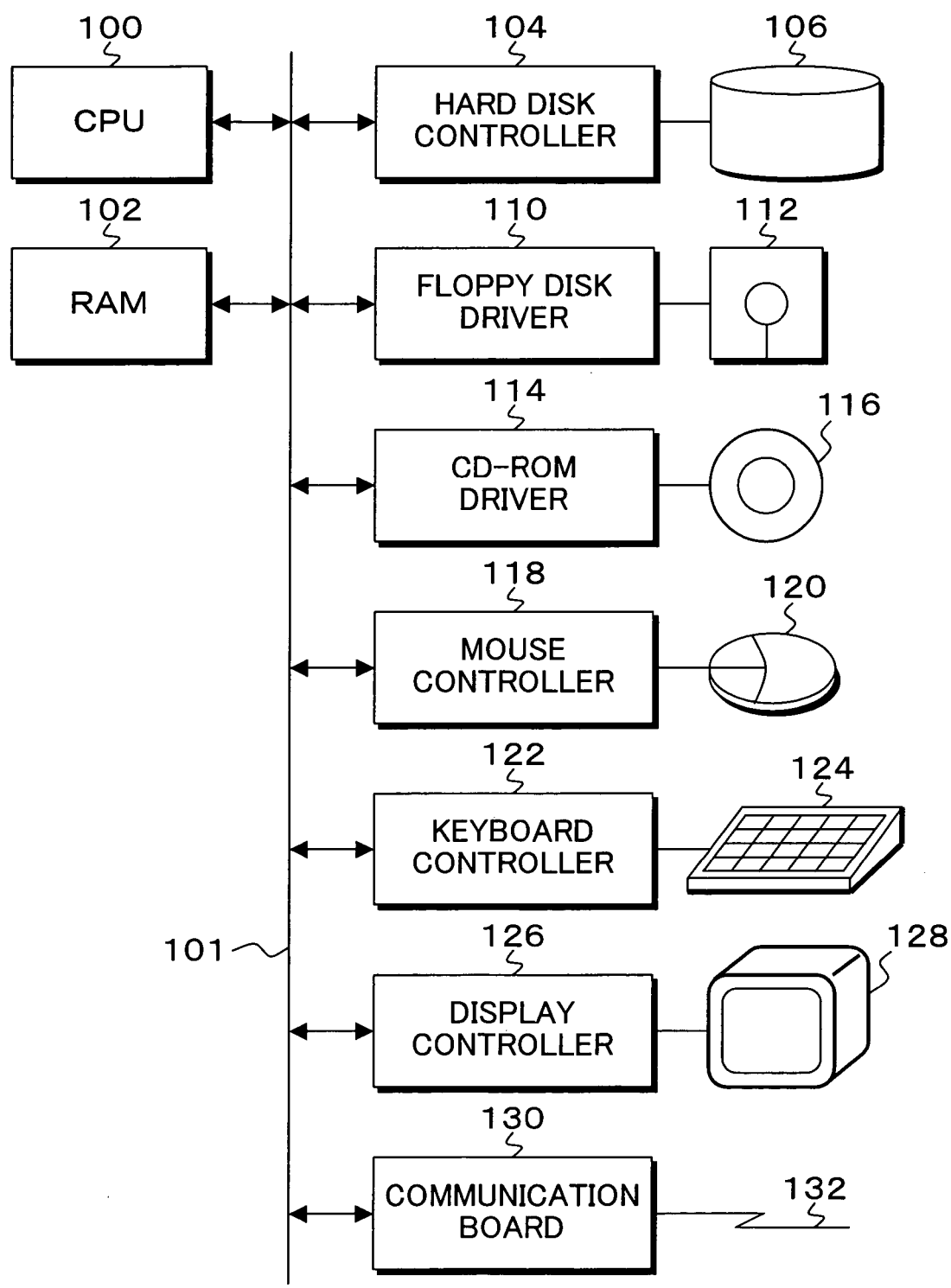
FIG. 3 is a descriptive view of the hardware environment of a computer to which the user device shown in FIG. 2 is applied.

The user device 10 shown in FIG. 2 is realized with hardware resources of a computer such as the one shown in FIG. 3. In the computer of FIG. 3, a RAM 102, a hard disk controller (software) 104, a floppy disk driver (software) 110, a CD-ROM driver (software) 114, a mouse controller 118, a keyboard controller 122, a display controller 126, and a communication board 130 are connected to a bus 101 of a CPU 100. The hard disk controller 104 connects a hard disk driver 106; loads the program for executing skin generating processing of the present invention; calls the necessary program from the hard disk 106 upon starting up the computer; deploys the program on the RAM 102; and executes the same by means of the CPU. A floppy disk drive (hardware) 112 is connected to the floppy disk driver 110 to permit read and write of a floppy disk (R). A CD drive (hardware) 116 is connected to the CD-ROM driver 114, thereby making it possible to read data or the program stored in the CD. The mouse controller 118 communicates the input operation of the mouse 120 to the CPU 100. The keyboard controller 122 communicates the input operation of the keyboard 124 to the CPU 100. The display controller 126 performs display to the display unit 128. The communication board 130 carries out communications with the devices within the network or with servers on the external internet via a LAN.

Figure 4:
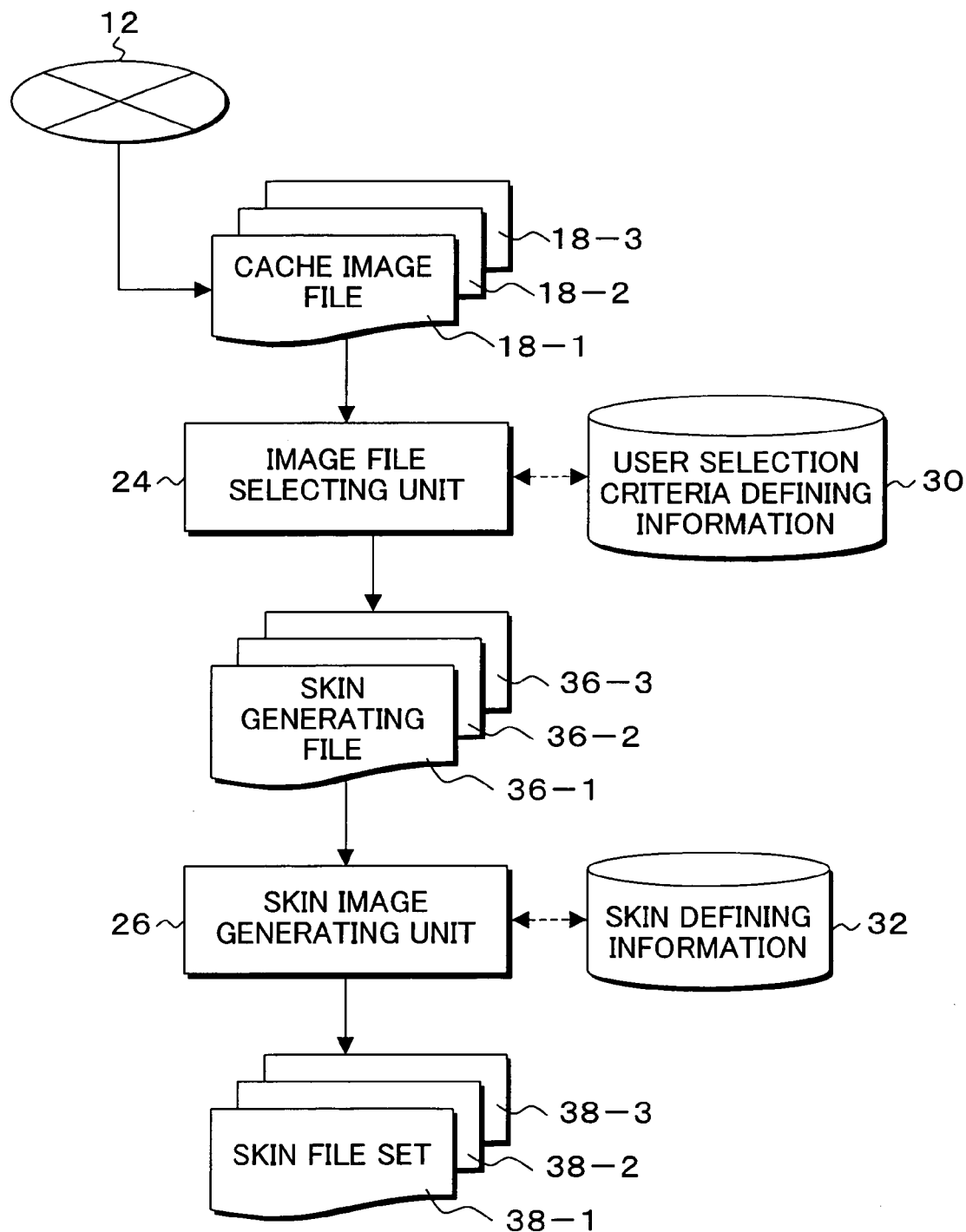
FIG. 4 is a descriptive view of the procedure of skin generating processing according to the present invention.

FIG. 4 is a descriptive view of the skin generating processing procedure according to the present invention. In FIG. 4, the image file selecting unit 24 selects files for skin image generation for cache image files 18-1 to 18-3 cached upon accessing files on the internet 12 or on a local machine. Criteria for this selection of files are based on the user selection criteria information 30. Image files meeting user's preference such as a color, shape, or an article defined by the user as criteria in advance are generated as skin generating files 36-1, 36-2 and 36-3. As user selection criteria defining information, judgment criteria such as:

(1) Favorite color;
(2) Favorite shape; and
(3) Favorite article (such as automobile, idol, dog or cat)

are stored as defining information. The skin image generating unit 26 generates skin images on the basis of the skin generating files 36-1 to 36-3 meeting user's preference selected by the image file selecting unit 24. The skin defining information 32 is used for generation of these skin images. The skin defining information 32 defines, for example:

(1) Image size;
(2) Position of image;
(3) Number of images; and
(4) Name of image file.

Therefore, the skin generating unit 26 prepares skin operating file sets 38-1 to 38-3 for generating skin images from the skin generating files 36-1 to 36-3 in accordance with the skin defining information 32. Upon preparing the skin generating file sets by the skin image generating unit 26, for example, the following image conversion is applied to the images of the skin generating files 36-1 to 36-3 which are origins of preparation.

(1) Rotation of images;
(2) Enlargement or reduction of images;
(3) Color reversal or color change of images;
(4) Synthesis of a plurality of images; and
(5) Deformation through an image filter such as shading-off or sepia color conversion.

The skin files sets 38-1 to 38-3 thus prepared 1:1-correspond to the skin defining information 32. The skin application 22 shown in FIG. 2 uses the same as skin data, and as a result, for example, a skin image for calendar provided by the application is generated and displayed on the display. The skin image thus generated by the skin Image generating unit 26 and displayed is cancelled at the next update timing, and newly generated on the basis of the then cache image file. Only if it is before cancellation at the next update timing, the user can register the same in a skin storing file by clicking the "Favorite Skin" displayed on the skin display screen, and even when the update timing is finally reached and the skin image is cancelled, can display the same again at any time by use of the contents of registration of the skin storing file.

FIG. 5 is a descriptive view of skin update and storage in the automatic update mode according to the present invention. In FIG. 5, in the automatic update mode of the present invention, on the time axis of time t, skin file sets 40-1, 40-2 and 40-3 for skin image display are prepared from the cache image files, respectively, at timings t1, t2 and t3 having a prescribed interval T. When the skin file sets 40-1, 40-2 and 40-3 are prepared as described above, before the update timing is reached after the lapse of the next update interval T, the presence or absence of registration in the "Favorite Skin" can be specified in compliance with user's instruction 42-1, 42-2 or 42-3. The user's instruction 42-1 represents a case where the user does not select the same. In this case, upon updating at time t2, skin file set 40-1 valid to the moment is cancelled. For the skin file sets 40-2 and 40-3 at time t2 and t3, in contract, registration in the "Favorite Skin" by user's instruction 42-2 and 42-3 has been selected. As a result, these sets 40-2 and 40-3 are registered, and can be read out from the skin storing file 34 and displayed again at any time thereafter.

FIG. 6 schematically illustrates the skin image generating processing according to the present invention with reference to a case of a calendar application. In FIG. 6, a skin image 44 for the calendar application is displayed on the display by the calendar application. This skin image 44 for calendar application has a main embedding area 46 serving as a skin image embedding area and monthly embedding areas 48-1 to 48-12 arranged thereunder. Information including the size, position and number of images of the main embedding area 46 and the monthly embedding areas 48-1 to 48-12 is stored in the skin defining information 32 shown in FIG. 2. The number of days for the current month and the days of the weed are fixedly displayed in portions of the monthly embedding areas 48-1 to 48-12, and skin images serving as background images are embedded. For the skin image 44 for calendar application as described above, as shown to the left, images 50-1 to 50-4 selected on the basis of the user from the cache image file by the image file selecting unit 24, for example, are acquired. For example, the selected image 50-1 is arranged in the main embedding area 46, and the selected images 50-2 to 50-4 are embedded in the monthly embedding areas 48-1, 48-5 and 48-9. In this case, image size converted since the embedding areas sizes different between the selected images 50-1 to 50-4 and the skin image 44 for calendar application 44. For the selected image 50-1, for example, the image is enlarged and arranged in the main embedding area 46, and for the selected images 50-2 to 50-4, the images are reduced in size and arranged in the monthly embedding areas 48-1, 48-5 and 48-9. The, example described above a case of the arrangement of selected images in three monthly embedding areas 48-1, 48-5 and 48-9. Actually, however, embedding is conducted by use of selected images not shown also for the remaining nine monthly embedding areas. The skin images prepared by embedding selected images for the skin image 44 for calendar application as described above are image files meeting the preference specified by the user from among the image files collected through access to the internet, and directly reflect user's preference.

Figure 7A:
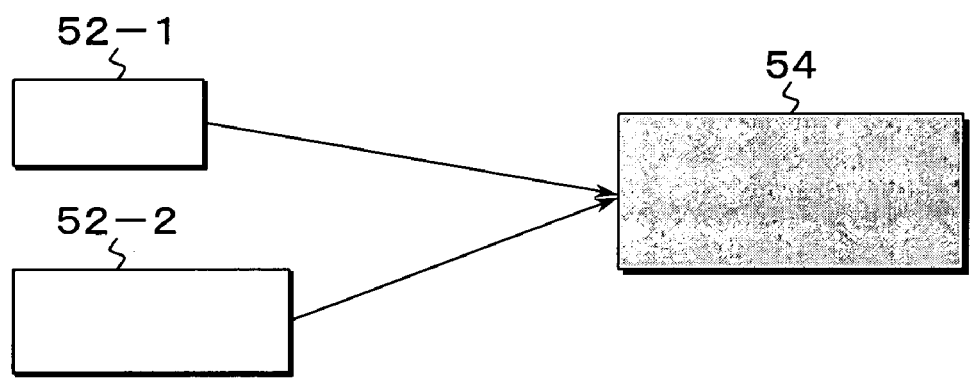
FIGS. 7A and 7B are descriptive views of image converting processing in skin generation of the present invention.
Figure 7B:
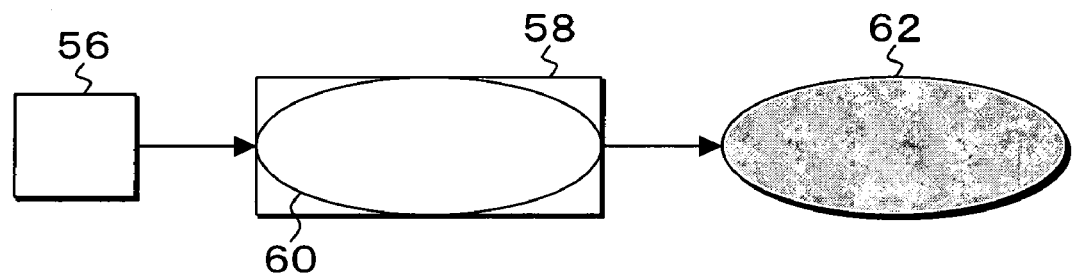

FIGS. 7A and 7B describe in detail an example of image conversion conducted upon embedding selected images as shown in FIG. 6 in the main image. FIG. 7A illustrates generation of a synthesized image 54 by synthesizing selected images 52-1 and 52-2. In FIG. 7B, after enlarging the selected image 56 into a converted image 58, a trimmed image 62 is generated by hollowing out, for example, an elliptic trimming area 60. Image synthesis as shown in FIG. 7A and trimming as shown in FIG. 7B are automatically accomplished in accordance with the definition of the skin defining information 32 relative to the generated skin image.

Figure 8:
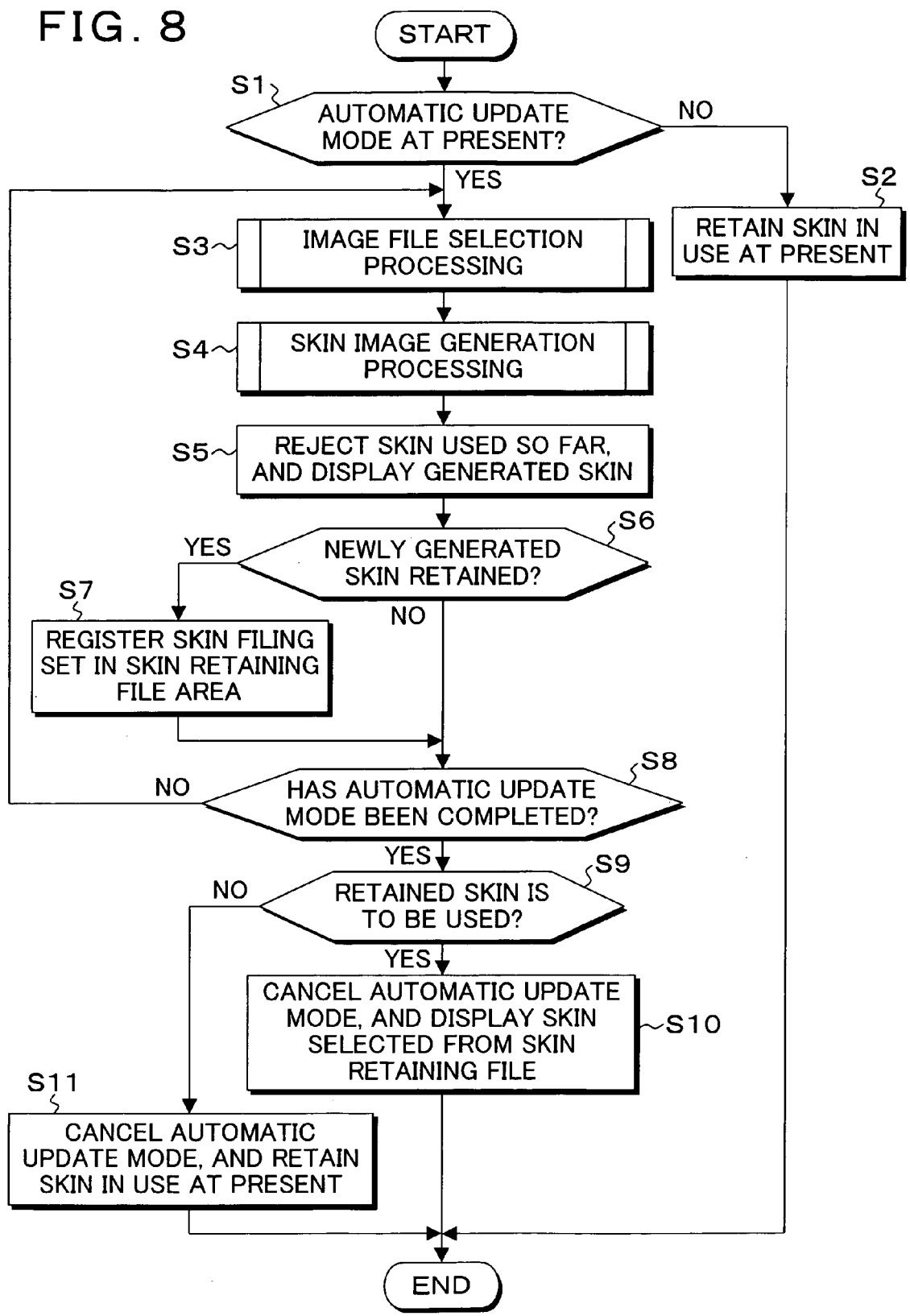
FIG. 8 is a flowchart of skin generating processing according to the present invention.

FIG. 8 is a flowchart of skin generating processing according to the present invention. The processing procedure shown in this flowchart constitutes the contents of the skin generating processing program provided by the present invention. This skin generating processing procedure will now be described.

Step S1: Determining whether or not the current state is in the automatic update mode; if not, the process advances to step S2, and if in the automatic update mode, the process goes to step S3;

Step S2: Step S2 covers a case not in the automatic update mode; retaining the currently applied skin image as it is, completing the processing;

Step S3: This is the case of automatic update mode; carrying out an image file selecting processing for selecting files for applying to the skin from the folder stored in the cache image file 18 of the WWW browser 16;

Step S4: Conducting a skin image generating processing for generating a skin image for the selected file;

Step S5: Canceling the skin so far applied at the time point when the skin image is generated, and displaying the newly generated skin by the application thereof;

Step S6: Regarding an applied skin, determining the presence or absence of an instruction to store for registration in the "Favorite Skin"; if stored, the process advances to step S7; if not stored, the process goes to step S8; in this case, the operation of storing a newly generated skin is performed in compliance with an instruction from a button or a menu for registration of a skin image in the same manner as in the procedure for registration of a usual internet address in the "Favorite Skin" or the "Book Mark".

Step S7: Copying the currently applied skin file in the skin storing file 34 serving as a special area for "Favorite Skin".

Skin S8: Checking whether or not the automatic update mode has been completed; if the user has completed the automatic update mode, the process advances to step S9, and if not, the process goes back to step S3;

Step S9: When the automatic update mode has been completed, determining whether or not the user has made a selection to use a stored skin; when using a skin in storage, the process advances to step S10, and if not, to step S11;

Step S10: Canceling the automatic update mode and selecting the skin selected from the skin storing file 34 to display the same;

Step S11: Canceling the automatic update mode, retaining the current skin to complete the processing.

Figure 9:
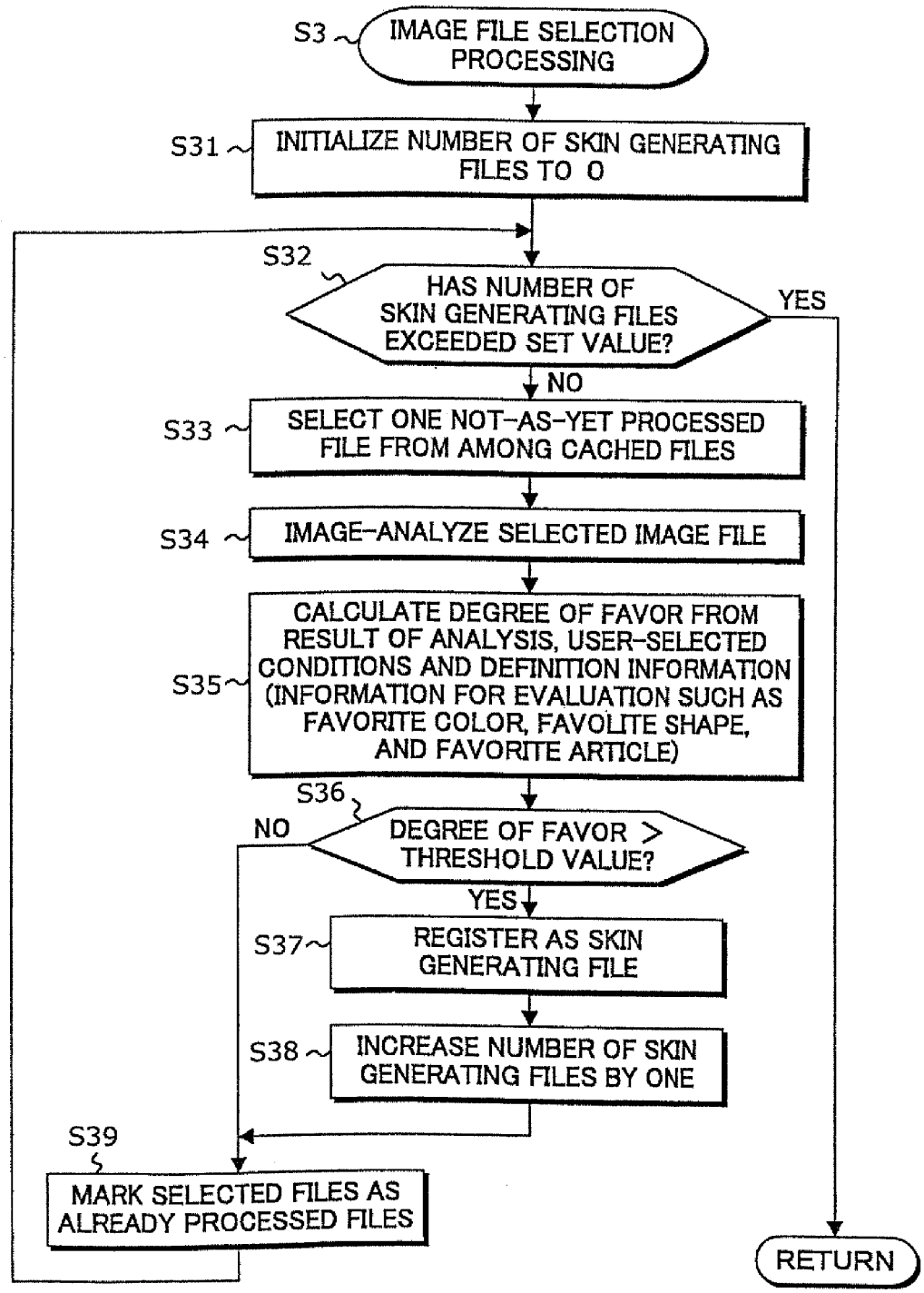
FIG. 9 is a flowchart of image file selecting processing shown in FIG. 8.

FIG.9 is a flowchart of the image file selecting processing in step S3 shown in FIG.8. The image file selecting processing is accomplished in the following processing procedure:

Step S1: Initializing the number of files for skin generation to 0;

Step S2: Determining whether or not the number of files for skin generation is over a set value; if over, ending the processing; if not over, the process advances to step S3; it is also possible to process all cache files without setting a particular number of files;

Step S3: When the number of files is not over a set value, selecting a single image file not as yet selected from the cache image files 18 cached in a cache folder of the WWW browser 16;

Step S4: Carrying out image analysis of the selected image files; the image analysis is conducted through the following sub-steps (1) to (3):

(1) For color analysis, each pixel is represented by H-S-V data expressing the saturation, value and hue, and standard value of hue is decided for all pixels. This is not limited to the analysis with H-S-V data, but analysis may be based on RGB data usually used for bit map data, or on Y-Cr-Cb data commonly used for MPEG data.

(2) For shape analysis, straight line components in the image are determined by Hough transform the luminance information in the image. Presence of many straight lines can be determined to form a straight configuration. A case with a small number of straight lines or a case where clear straight lines cannot be calculated may be considered to form curved configuration.

(3) When the shape of an article is to be analyzed, retaining in advance the shape of the article, and making a determination through pattern matching between the bit map pattern and the image.

Step S5: Taking out judgment criteria information from the user selection criteria defining information 30 setting user's preference; and calculating a degree of favor from the result of image analysis obtained in step S4. For example, when analyzing color with HSV, values of the degree of favor are previously mapped in an area on the HSV coordinates. When an analytical result is obtained, the result of analysis is placed on HSV coordinates to see in what area the result is contained to determine a mark of the degree of favor. When there are a plurality of judgment criteria such as the shape and the article in addition to the color, total marks determined in accordance with the individual judgment criteria are calculated.

Step S6: Determining whether or not the degree of favor calculated in step S5 is larger than the predetermined threshold value. If larger than the threshold value, the process advances to step S7, and if under the threshold value, to step S9. While the degree of favor is compared with the threshold value in this case, it is also possible to register all files in the form containing the information of the calculated degrees of favor in the skin generating file list, and processing for generating skin files these files in a sequence from a higher to lower values of the degree of favor.

Step S7: Registering a file as a skin file since the file shows a degree of favor higher than the threshold value.

Step S8: Increasing the number of skin generating files by one.

Step S9: Apply marking to the currently selected file as a processed file. The process returns to step S2 to repeat the same processing for the next file.

Figure 10:
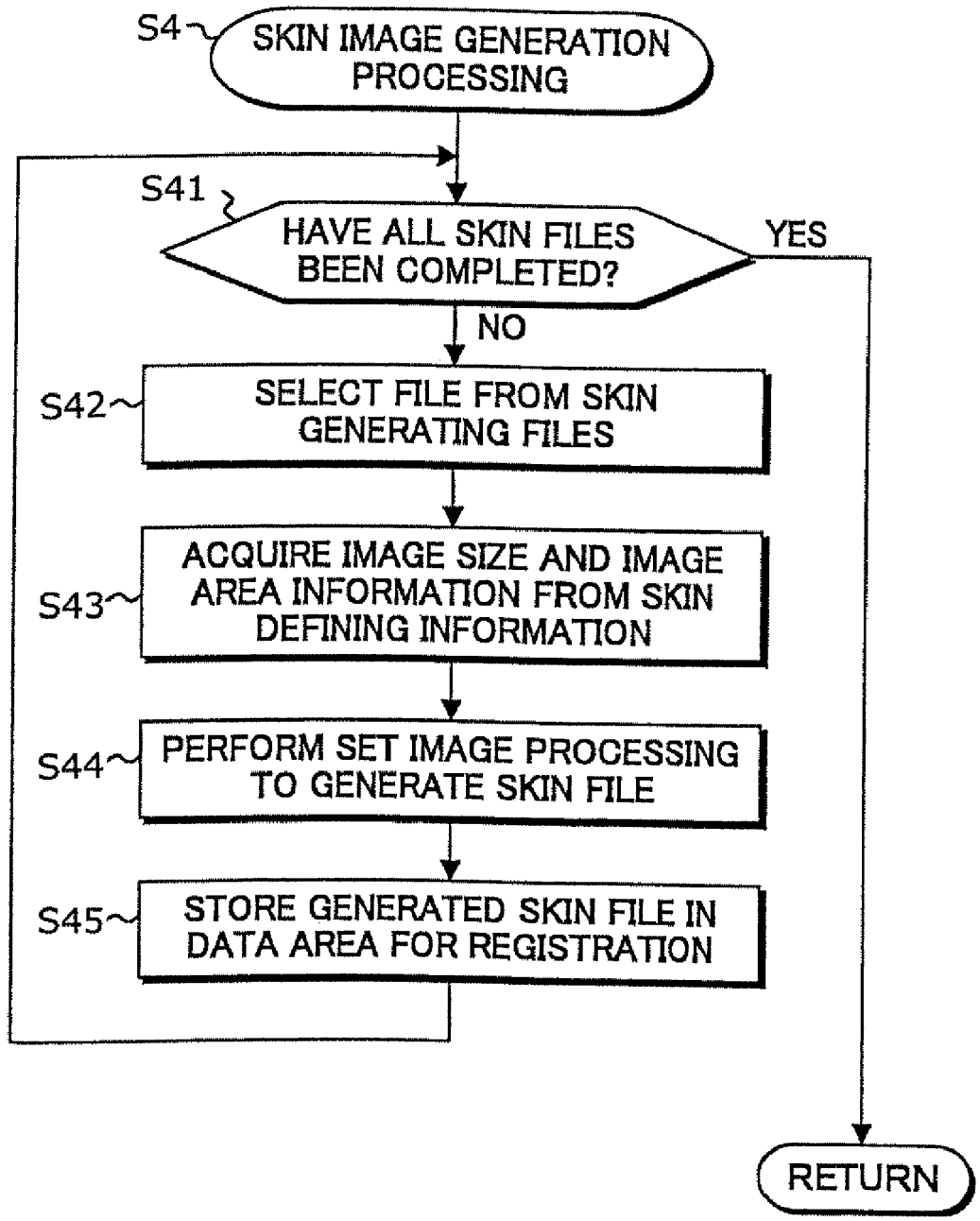
FIG. 10 is a flowchart of skin image generating processing shown in FIG. 8.

FIG. 10 is a flowchart of skin image generating processing in step S4 shown in FIG. 8. The processing procedure will now be described below.

Step S1: Checking whether or not all the skin files have been generated. If generated, the processing comes to an end. If not as yet generated, the process advances to step S2.

Step S2: Selecting files from the skin generating files. In this case, when a degree of favor has been added in the image file selecting processing shown in FIG. 9, files may be selected in a sequence from higher to lower degrees of favor.

Step S3: Acquiring an image size or image area information of the file to be registered as a skin from the skin defining information 32.

Step S4: Deciding how to deform the files selected from the acquired information, from the skin defining information 32 to perform image converting processing. For example, enlarging or reducing the image size, and further, carrying out rotation or color conversion in accordance with the defining information.

Step S5: Storing the generated skin file into the data area for skin file registration.

In the skin generation of the present invention, as described above, it is possible to automatically prepare a skin provided by the application. According as more web pages on the internet or more files on a local machine are accessed, more skins of a new design are automatically generated, and skins meeting user's preference are prepared. Skins meeting user's preference can be additionally stored as favorite skins. As required, designs of favorite skins can be reproduced at any time.

In the above-mentioned embodiment, a personal computer has been described as a user device.

However, the present invention is not limited to this, but is applicable in quite the same manner also to application skins at portable terminals such as cell phones or PDAs. The present invention includes appropriate variations not impairing the object and advantages thereof, and is not limited by numerals shown in the above-mentioned embodiment.

What is claimed is:

1. A skin generating method comprising:
an image file selecting step of selecting a plurality of image files from a group of image files in a temporary storing unit of a browser by an image file selecting unit; and
a skin image generating step of generating a skin image through combination and arrangement of the plurality of image files selected by a skin image generating unit, said skin image generating step including generating a skin image through combination and arrangement of the plurality of image files selected on the basis of skin defining information provided by an application, carrying out image processing including size conversion, synthesizing or trimming of the plurality of image files so as to agree with the skin image, and storing a generated and displayed skin image in a skin image storing file on the basis of input of a user instruction, to make said skin image available;
wherein said image file selection step includes selecting image files to be used for skin generation from a group of image files stored in the temporary storing unit of the browser on the basis of selection criteria defining information specified in advance by the user, said selection criteria defining information defines a favorite color, a favorite shape, a favorite article or a combination thereof as a user selection criterion, said image file selecting step including calculating a degree of favor for image files regarding the favorite color, the favorite shape, or the favorite article defined by the user as said selection criteria defining information, and preferentially selecting image files of high degrees of favor.;
an update interval setting step of setting an update interval of a skin image generated in said image selecting step and said skin image generating step.

2. A computer-readable medium including a program causing a computer to execute:
an image file selecting step of selecting a plurality of image files to be used for skin generation from a group of image files stored in a temporary storing unit of a browser; and
a skin image generating step of generating a skin image through combination and management of the plurality of selected image files, said skin image generating step including generating a skin image through combination and arrangement of the plurality of image files selected on the basis of skin defining information provided by an application, carrying out image processing including size conversion, synthesizing or trimming of the plurality of selected image files so as to agree with the skin image, and storing a generated and displayed skin image on the basis of user's input of an instruction in a skin image storing file to make it available;
an update interval setting step of setting an update interval of skin images generated in said image file selecting step and said skin image generating step;
wherein said image file selection step includes selecting image files to be used for skin generation from a group of image files stored in the temporary storing unit of the browser on the basis of selection criteria defining information specified in advance by the user, calculating a degree of favor for an image file regarding the favorite color, the favorite shape or the favorite article defined by the user as said election criteria defining information and preferentially selecting an image file of a high degree of favor;
said selection criteria defining information defines a favorite color, a favorite shape, a favorite article or a combination thereof as a user selection criterion.

3. A skin generating apparatus comprising:
an image file selecting unit which selects a plurality of image files to be used for skin generation from a group of image files stored in a temporary storing unit of a browser, calculates a degree of favor for an image file regarding the favorite color, the favorite shape or the favorite article defined by the user as said selection criteria defining information, and preferentially selects image files of a high degree of favor; and a skin image generating unit which generates a skin image through combination and arrangement of a plurality of selected image files, generates a skin image through combination and arrangement of the plurality of image files selected on the basis of the skin defining information provided by the application wherein said skin image generating unit includes carry out image processing including size conversion, synthesizing or trimming of the plurality of selected image files so as to meet the skin images, and stores the generated and displayed skin image in a skin image storing file on the basis of input of a user's instruction;

an update interval setting unit which sets an update interval for all skin images generated by said image file selecting unit and said skin image generating unit;

wherein said image file selection step includes selecting image files to be used for skin generation from a group of image files stored in the temporary storing unit of the browser on the basis of selection criteria defining information specified in advance by the user, said selection criteria defining information defines a favorite color, a favorite shape, a favorite article or a combination thereof as a user selection criterion.

* * * * *

UNITED STATES PATENT AND TRADEMARK OFFICE
CERTIFICATE OF CORRECTION

| | | |
|---|---|---|
| PATENT NO. | : 7,373,610 B2 | Page 1 of 1 |
| APPLICATION NO. | : 10/778222 | |
| DATED | : May 13, 2008 | |
| INVENTOR(S) | : Yasufumi Nakamura | |

It is certified that error appears in the above-identified patent and that said Letters Patent is hereby corrected as shown below:

Column 10, Line 17, change "favor.;" to --favor;--.

Column 10, Line 49, change "election" to --selection--.

Signed and Sealed this

Sixteenth Day of September, 2008

JON W. DUDAS
*Director of the United States Patent and Trademark Office*